United States Patent [19]
Johnson

[11] Patent Number: 6,105,999
[45] Date of Patent: *Aug. 22, 2000

[54] AIRBAG COVER ASSEMBLY

[75] Inventor: Dennis S. Johnson, Kewaskum, Wis.

[73] Assignee: Serigraph, Inc., West Bend, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/944,186

[22] Filed: Oct. 6, 1997

[51] Int. Cl.$^7$ ........................................................ B60P 1/43
[52] U.S. Cl. ........................ 280/727; 280/728.3; 280/731; 40/593
[58] Field of Search .................................. 280/727, 728.3, 280/731, 732; 428/31; 40/593, 591

[56] References Cited

U.S. PATENT DOCUMENTS

| | | | |
|---|---|---|---|
| 3,670,120 | 6/1972 | Corn et al. | 200/61.54 |
| 5,558,384 | 9/1996 | Davis | 280/728.3 |
| 5,775,721 | 7/1998 | GRout | 280/727 |

FOREIGN PATENT DOCUMENTS

| | | | |
|---|---|---|---|
| 5-162606 | 6/1993 | Japan . | |
| 5-193434 | 8/1993 | Japan | 280/728.3 |

*Primary Examiner*—Christopher P. Ellis
*Attorney, Agent, or Firm*—Andrus, Sceales, Starke & Sawall

[57] ABSTRACT

A cover assembly for a vehicle airbag containing decorative material. The cover assembly includes a resilient polymeric cover and an insert is located on the upper surface of the cover. The outer peripheral portion of the insert is imbedded in the cover while the central portion of the insert which bears the decorative material is exposed. The peripheral portion of the insert includes at least one opening and the polymeric material of the cover is disposed in the opening to mechanically interlock the insert to the cover. The cover is designed to split along a line of weakness on the deployment of the airbag and the line is located so that the insert is positioned wholly within one of the split cover sections.

12 Claims, 1 Drawing Sheet

AIRBAG COVER ASSEMBLY

BACKGROUND OF THE INVENTION

Airbags are commonly used in automobiles and other vehicles to protect the passengers in the event of frontal impact. An airbag is mounted in the steering wheel of the vehicle to protect the driver and in many cases a second airbag is mounted in the dash to protect the passenger. The conventional airbag is enclosed by resilient cover composed of a polymeric material and the cover is designed to split on deployment of the airbag into two hinged section to permit the inflated bag to pass between the sections.

As the airbags are located directly ahead of the driver and the passenger it is desirable to apply decorative material, such as a logo or other designs, to the airbag cover. In the past logos and designs have been embossed in the airbag cover. However the embossed designs are the same color as the airbag cover itself so that the designs are not particularly noticeable.

It is also been proposed to apply a separate printed insert to the airbag cover. In one such construction the insert is connected via bent tabs to the cover. However, any such insert attached to the airbag cover must be positively fixed to the cover to prevent the insert from being detached from the cover on deployment of the airbag. If the insert is not firmly attached, the force of the airbag deployment could propel the insert through the vehicle resulting in a potential hazard to the occupants of the vehicle.

BRIEF SUMMARY OF THE INVENTION

The invention is directed to an improved cover assembly for a vehicle airbag having an insert bearing decorative material that is positively locked to the airbag cover.

In the preferred form of the invention, the cover assembly includes a cover composed of a resilient polymeric material and having an opening spaced from the peripheral edge of the cover. An insert is mounted within the opening of the cover and includes a central portion bearing decorative material, such as a logo or other designs. The insert is also provided with an outer peripheral portion which is imbedded within the cover and the peripheral portion includes at least one or more openings. During molding of the cover, the polymeric material flows into the openings of the insert, thus mechanically interlocking the insert to the cover.

The cover is formed of two or more sections which are joined along a line of weakness or split line which is spaced from the insert. When the airbag is deployed, the cover sections will separate along the split line and due to the mechanical lock between the insert and the cover section, the insert will remain firmly fixed to the cover section and will not be separated and propelled through the vehicle by the force of the deployment.

Other objects and advantages will appear during the course of the following description.

DESCRIPTION OF THE DRAWINGS

The drawing illustrate the best mode presently contemplated of carrying out the invention.

In the drawings.

DESCRIPTION OF THE ILLUSTRATED EMBODIMENT

Figure 1:
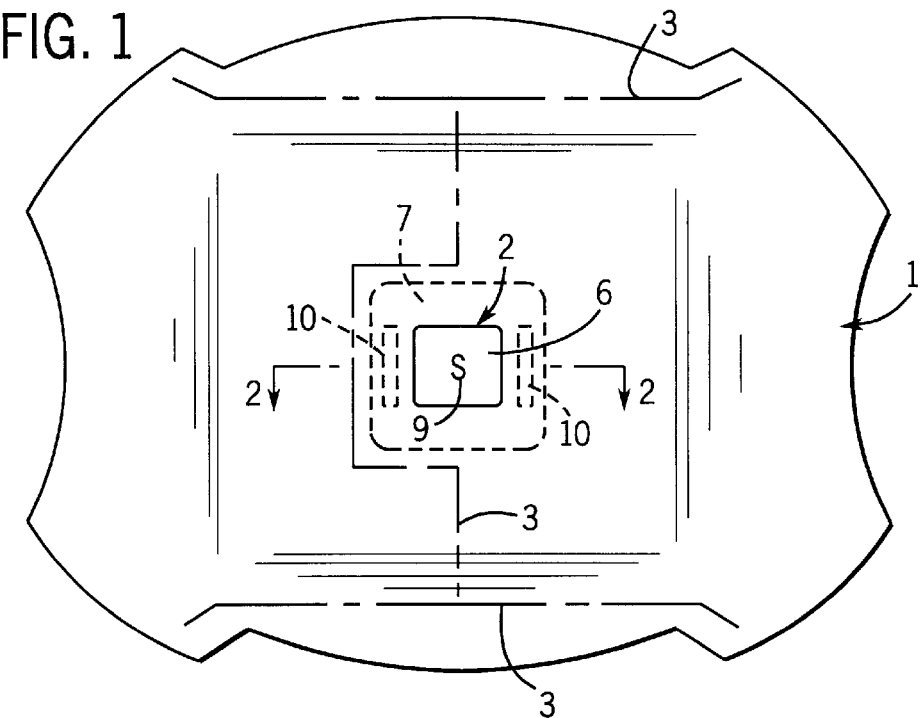
FIG. 1 is a plan view of an airbag cover incorporating the invention.
Figure 2:
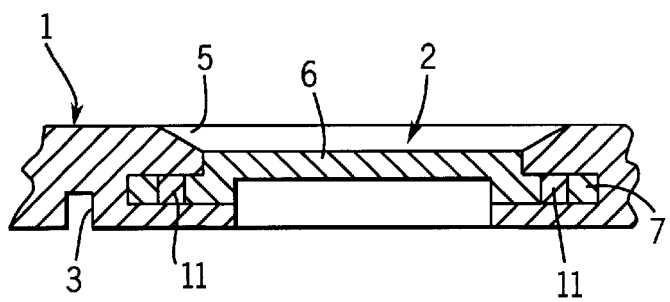
FIG. 2 is a section taken along line 2—2 of FIG. 1.
Figure 3:
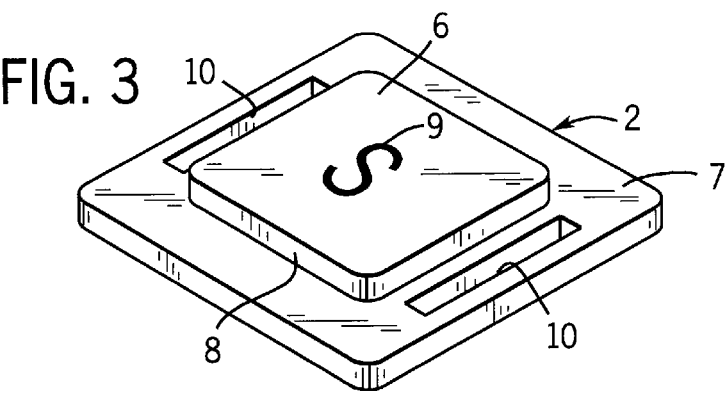
FIG. 3 is a perspective view of the insert.

FIGS. 1 and 2 illustrate a cover assembly for a vehicle airbag that includes a cover 1 and an insert 2.

Cover 1 is of a conventional shape or configuration and is adapted to cover an inflatable airbag that is mounted either in the steering wheel or the dash of a vehicle. Cover 1 is preferably formed of a resilient polymeric material such as polyvinyl chloride nylon or the like. Cover 1 is formed with a line of weakness or split line, indicated by 3. When the airbag is deployed, the cover will split along the line 3 to permit the inflated airbag to pass between the hinged cover sections in the conventional manner.

In a preferred form of the invention, cover 1 is provided with an opening 5 and the central portion 6 of insert 2 is located within opening 5. Insert 2 also includes a peripheral edge portion 7 which is offset from central portion 6 and is connected to the central portion through a circumferential step 8. As shown in FIG.2, the peripheral edge portion of insert 2 is positioned between the upper and lower surfaces of the cover 1.

Insert 2 is preferably formed of a rigid material, such as metal or plastic and the upper surface of insert 2 is provided with printed decorative material 9 which can take the form of a design, logo or other name recognizable indicia.

As a feature of the invention the peripheral edge portion 7 of insert 2 is provided with a pair of openings 10 which are located on opposite sides of the central portion 6. As best shown in FIG. 1, openings 10 are generally rectangular in shape and are elongated.

In producing the cover assembly, cover 1 is molded around the preformed insert 2 and during the molding operation the resin of the cover 1 will flow into the openings 10. After solidification, the resin located within openings 10, and indicated by 11, will provide a mechanical interlock between insert 2 and cover 1 The mechanical interlock will prevent the insert from being released from the cover during deployment of the airbag Split line 3 is spaced from insert 2 so that when the cover splits under the force of airbag deployment, the insert will be retained within one of the cover sections.

While the drawings have shown a pair of openings 10 in insert 2 the number and location of the openings in the peripheral edge portion of the insert is not critical. It is also contemplated that the openings 10 need not extend completely through edge portion 7. Thus, the term "opening" as used in the specification and claims is intended to cover a hole or aperture that extends completely through edge portion 7, as well as a recess or depression in the edge portion. Further the insert can be located in any area of the cover and the split line 3 of the cover can be positioned so that it is spaced from the insert 2.

The use of the step 8 to connect the central portion 6 with the peripheral edge portion 7 of insert 2 enables the central portion to be raised relative to the embedded edge portion 7 so that the decorative material will be more prominently displayed.

While the drawings show the central portion 6 of insert 2 being located within an opening 5 in the cover it is contemplated that the central portion 6 can be located within a recess or depression in the cover, or alternately the central portion of the insert can be disposed on the upper surface of the cover. In any case, the central portion of the insert would be located adjacent the upper surface of the cover and the peripheral portion 7 of the insert would be imbedded in the cover and the insert would be mechanically interlocked to the cover through the polymeric material of the cover being located within the openings 10 in the peripheral portion of the insert.

I claim:

1. A cover assembly for a vehicle airbag, comprising a cover composed of a resilient material and having an upper surface and a lower surface, an insert disposed adjacent the upper surface of said cover and including a central portion and an outer peripheral portion extending radially outward from said central portion, a first of said portions being embedded in said cover and a second of said portions being exposed, said second portion having an upper face, decorative material disposed on said upper face, said first portion having at least one opening, said material of the cover disposed in said opening to thereby mechanically interlock said insert to said cover.

2. The cover assembly of claim 1, wherein said cover includes a split line, said cover being constructed and arranged to separate at said split line on deployment of the airbag, said split line being spaced from said insert.

3. A cover assembly for a vehicle airbag, comprising a cover composed of a resilient polymeric material and having an opening therein, and an insert fixed to the cover and having a central portion disposed in the opening and having an outer peripheral portion embedded in the cover, said peripheral portion having at least one opening, said polymeric material of the cover disposed in the opening to thereby mechanically interlock the insert to the cover.

4. The cover assembly of claim 3, wherein said central portion has an outer surface and said cover assembly includes printed decorative material on said outer surface.

5. The cover assembly of claim 1, wherein said cover has an inner surface and an outer surface, said outer peripheral portion of the insert being disposed between said inner and outer surfaces.

6. The cover assembly of claim 1, wherein said peripheral portion of said insert is disposed in a plane offset from the plain of said central portion.

7. The cover assembly of claim 6, and including a circumferential step connecting said central portion and said outer peripheral portion.

8. The cover assembly of claim 3, wherein said peripheral portion includes a pair of said openings with said openings being located on opposite sides of said central portion.

9. The cover assembly of claim 8, wherein each of said openings is elongated in shape and extends completely through said edge portion.

10. The cover assembly of claim 1, wherein said insert is composed of a rigid material selected from the group consisting of metal and plastic.

11. The cover assembly of claim 1, wherein said first portion is an outer peripheral portion and said second portion is a central portion disposed radially inward of said outer peripheral portion.

12. A cover assembly for a vehicle airbag, comprising a cover composed of a resilient material and having an upper surface and a lower surface, an insert fixed to the cover and having an exposed central portion and having an outer peripheral portion embedded in the cover, indicia disposed on the exposed central portion, said peripheral portion having at least one opening, said polymeric material of the cover disposed in the opening to thereby mechanically interlock the insert to the cover, said cover including a split line, said cover being constructed and arranged to separate at said split line on deployment of the airbag, said split line being spaced from said insert.

* * * * *